United States Patent
Bhavaraju et al.

(10) Patent No.: US 10,854,929 B2
(45) Date of Patent: Dec. 1, 2020

(54) SODIUM-HALOGEN SECONDARY CELL

(71) Applicant: FIELD UPGRADING USA, INC., Broomfield, CO (US)

(72) Inventors: Sai Bhavaraju, West Jordan, UT (US); Mathew Robins, Saratoga Springs, UT (US); Alexis Eccleston, Midvale, UT (US)

(73) Assignee: FIELD UPGRADING USA, INC., Broomfield, CO (US)

(*) Notice: Subject to any disclaimer, the term of this patent is extended or adjusted under 35 U.S.C. 154(b) by 0 days.

(21) Appl. No.: 14/956,078

(22) Filed: Dec. 1, 2015

(65) Prior Publication Data
US 2016/0087313 A1 Mar. 24, 2016

Related U.S. Application Data

(63) Continuation-in-part of application No. 14/511,031, filed on Oct. 9, 2014, now abandoned, which is a
(Continued)

(51) Int. Cl.
*H01M 10/00* (2006.01)
*H01M 10/39* (2006.01)
(Continued)

(52) U.S. Cl.
CPC ........... *H01M 10/399* (2013.01); *H01M 2/40* (2013.01); *H01M 4/381* (2013.01); *H01M 4/388* (2013.01);
(Continued)

(58) Field of Classification Search
CPC ........... H01M 10/399; H01M 10/4235; H01M 10/36; H01M 10/0562; H01M 10/0563;
(Continued)

(56) References Cited

U.S. PATENT DOCUMENTS 3,546,021 A 12/1970 Gale
3,632,448 A 1/1972 Beltzer
(Continued)

FOREIGN PATENT DOCUMENTS

EP 2935655 10/2015
EP 2973832 1/2016
(Continued)

OTHER PUBLICATIONS

Machine translation of FR 2115522, obtained Mar. 6, 2019 (Year: 1972).*
(Continued)

*Primary Examiner* — Nicholas P D'Aniello
(74) *Attorney, Agent, or Firm* — Foley & Lardner LLP

(57) ABSTRACT

An intermediate temperature sodium-halogen secondary cell that includes a negative electrode compartment housing a negative, molten sodium-based electrode and a positive electrode compartment housing a current collector disposed in a highly conductive molten positive electrolyte. A sodium halide (NaX) positive electrode is disposed in a molten positive electrolyte comprising one or more $AlX_3$ salts, wherein X may be the same or different halogen selected from Cl, Br, and I, wherein the ratio of NaX to $AlX_3$ is greater than or equal to one. A sodium ion conductive solid electrolyte membrane separates the molten sodium negative electrode from the molten positive electrolyte. The secondary cell operates at a temperature in the range from about 80° C. to 210° C.

17 Claims, 5 Drawing Sheets

Related U.S. Application Data continuation-in-part of application No. 14/019,651, filed on Sep. 6, 2013, now Pat. No. 9,413,036.

(60) Provisional application No. 62/087,507, filed on Dec. 4, 2014, provisional application No. 61/888,933, filed on Oct. 9, 2013, provisional application No. 61/697,608, filed on Sep. 6, 2012, provisional application No. 61/777,967, filed on Mar. 12, 2013, provisional application No. 61/781,530, filed on Mar. 14, 2013, provisional application No. 61/736,444, filed on Dec. 12, 2012.

(51) Int. Cl.

| | |
|---|---|
| *H01M 10/054* | (2010.01) |
| *H01M 10/0563* | (2010.01) |
| *H01M 4/38* | (2006.01) |
| *H01M 10/42* | (2006.01) |
| *H01M 2/40* | (2006.01) |
| *H01M 4/62* | (2006.01) |
| *H01M 10/0562* | (2010.01) |
| *H01M 10/36* | (2010.01) |
| *H01M 4/66* | (2006.01) |

(52) U.S. Cl.
CPC ........... *H01M 4/62* (2013.01); *H01M 10/054* (2013.01); *H01M 10/0562* (2013.01); *H01M 10/0563* (2013.01); *H01M 10/36* (2013.01); *H01M 10/4235* (2013.01); *H01M 4/661* (2013.01); *H01M 2300/0054* (2013.01); *H01M 2300/0068* (2013.01)

(58) Field of Classification Search
CPC ........ H01M 10/054; H01M 2/40; H01M 4/62; H01M 4/381; H01M 4/388; H01M 4/661; H01M 2300/0068; H01M 2300/0054
See application file for complete search history.

(56) References Cited

U.S. PATENT DOCUMENTS

| | | | |
|---|---|---|---|
| 3,877,984 A | 4/1975 | Werth | |
| 3,918,991 A | 11/1975 | Hess | |
| 4,020,246 A | 4/1977 | Seo et al. | |
| 4,041,215 A | 8/1977 | Kormanyos et al. | |
| 4,162,351 A | 7/1979 | Putt et al. | |
| 4,244,986 A | 1/1981 | Paruso et al. | |
| 4,307,164 A | 12/1981 | Church et al. | |
| 4,375,501 A | 3/1983 | Peled et al. | |
| 4,427,747 A | 1/1984 | Bennett et al. | |
| 4,485,154 A | 11/1984 | Remick et al. | |
| 4,546,055 A | 10/1985 | Coetzer et al. | |
| 4,579,796 A | 4/1986 | Muramatsu | |
| 4,753,858 A | 6/1988 | Jow et al. | |
| 4,828,939 A | 5/1989 | Turley et al. | |
| 4,842,963 A | 6/1989 | Ross, Jr. et al. | |
| 4,937,155 A | 6/1990 | Tokoi et al. | |
| 5,051,325 A | 9/1991 | Shishikura et al. | |
| 5,057,206 A | 10/1991 | Engel et al. | |
| 5,139,897 A | 8/1992 | Wedlake | |
| 5,213,908 A | 5/1993 | Hagedorn | |
| 5,264,298 A | 11/1993 | Townsend | |
| 5,290,405 A | 3/1994 | Joshi et al. | |
| 5,342,709 A | 8/1994 | Yahnke et al. | |
| 5,422,197 A | 6/1995 | Zito | |
| 5,427,873 A | 6/1995 | Shuster | |
| 5,516,598 A | 5/1996 | Visco et al. | |
| 5,525,442 A | 6/1996 | Shuster | |
| 5,536,594 A * | 7/1996 | Galloway | ............. H01M 10/39 205/57 |
| 5,541,019 A | 7/1996 | Anani et al. | |
| 5,552,244 A | 9/1996 | Griffin et al. | |
| 5,563,006 A | 10/1996 | Von Benda et al. | |
| 5,580,430 A | 12/1996 | Balagopal et al. | |
| 5,604,053 A | 2/1997 | Coetzer et al. | |
| 5,648,183 A | 7/1997 | Licht et al. | |
| 5,686,201 A | 11/1997 | Chu | |
| 5,695,632 A | 12/1997 | Brons et al. | |
| 5,780,186 A | 7/1998 | Casey, Jr. | |
| 5,856,047 A | 1/1999 | Venkatesan et al. | |
| 5,882,812 A | 3/1999 | Visco et al. | |
| 5,935,421 A | 8/1999 | Brons et al. | |
| 6,017,651 A | 1/2000 | Nimon et al. | |
| 6,025,094 A | 2/2000 | Visco et al. | |
| 6,030,720 A | 2/2000 | Chu et al. | |
| 6,033,343 A | 3/2000 | Licht | |
| 6,033,796 A | 3/2000 | Baji | |
| 6,110,236 A | 8/2000 | Tsang et al. | |
| 6,153,328 A | 11/2000 | Colborn | |
| 6,159,634 A | 12/2000 | Yen et al. | |
| 6,165,644 A | 12/2000 | Nimon et al. | |
| 6,200,704 B1 | 3/2001 | Katz et al. | |
| 6,210,564 B1 | 4/2001 | Brons et al. | |
| 6,210,832 B1 | 4/2001 | Visco et al. | |
| 6,214,061 B1 | 4/2001 | Visco et al. | |
| 6,225,002 B1 | 5/2001 | Nimon et al. | |
| 6,248,476 B1 | 6/2001 | Sun et al. | |
| 6,248,481 B1 | 6/2001 | Visco et al. | |
| 6,265,100 B1 | 7/2001 | Saaski et al. | |
| 6,270,923 B1 | 8/2001 | Bito et al. | |
| 6,291,090 B1 | 9/2001 | Kuznetsov et al. | |
| 6,310,960 B1 | 10/2001 | Saaski et al. | |
| 6,355,379 B1 | 3/2002 | Ohshita et al. | |
| 6,358,643 B1 | 3/2002 | Katz et al. | |
| 6,368,486 B1 | 4/2002 | Thompson et al. | |
| 6,376,123 B1 | 4/2002 | Chu | |
| 6,402,795 B1 | 6/2002 | Chu et al. | |
| 6,410,181 B1 | 6/2002 | Spillman et al. | |
| 6,413,284 B1 | 7/2002 | Chu et al. | |
| 6,413,285 B1 | 7/2002 | Chu et al. | |
| 6,416,903 B1 | 7/2002 | Fierro et al. | |
| 6,432,584 B1 | 8/2002 | Visco et al. | |
| 6,537,701 B1 | 3/2003 | Nimon et al. | |
| 6,610,440 B1 | 8/2003 | LaFollette et al. | |
| 6,632,573 B1 | 10/2003 | Nimon et al. | |
| 6,737,197 B2 | 5/2004 | Chu et al. | |
| 6,767,665 B1 * | 7/2004 | Ohrem | ..................... B01J 19/20 165/10 |
| 6,787,019 B2 | 9/2004 | Jacobson et al. | |
| 6,852,450 B2 | 2/2005 | Hwang et al. | |
| 6,881,234 B2 | 4/2005 | Towsley | |
| 6,911,280 B1 | 6/2005 | De Jonghe et al. | |
| 6,955,753 B1 | 10/2005 | Gomez | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,144,654 B2 | 12/2006 | LaFollette et al. | |
| 7,166,384 B2 | 1/2007 | LaFollette et al. | |
| 7,214,443 B2 | 5/2007 | Clarke et al. | |
| 7,259,126 B2 | 8/2007 | Gordon et al. | |
| 7,273,680 B2 | 9/2007 | Durkot | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,314,681 B2 | 1/2008 | Randell et al. | |
| 7,390,591 B2 | 6/2008 | Visco et al. | |
| 7,432,017 B2 | 10/2008 | Visco et al. | |
| 7,482,096 B2 | 1/2009 | De Jonghe et al. | |
| 7,491,458 B2 | 2/2009 | Visco et al. | |
| 8,012,621 B2 | 9/2011 | Joshi et al. | |
| 8,088,270 B2 | 1/2012 | Gordon et al. | |
| 8,168,321 B2 | 5/2012 | Shelekhin et al. | |
| 8,883,339 B2 | 11/2014 | Choi | |
| 8,968,902 B2 | 3/2015 | Coors et al. | |
| 9,413,036 B2 * | 8/2016 | Bhavaraju | ............. H01M 10/36 |
| 9,431,681 B2 * | 8/2016 | Joshi | ................ H01M 10/3909 |
| 2002/0150818 A1 | 10/2002 | Amatucci et al. | |
| 2002/0172871 A1 | 11/2002 | Schucker | |
| 2004/0065543 A1 | 4/2004 | Kovarsky | |
| 2005/0006252 A1 | 1/2005 | Korpel et al. | |
| 2005/0016857 A1 | 1/2005 | Kovarsky et al. | |

(56) References Cited

U.S. PATENT DOCUMENTS

| | | |
|---|---|---|
| 2005/0109617 A1 | 5/2005 | Ono et al. |
| 2005/0260460 A1 | 11/2005 | Kishi et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |
| 2007/0048610 A1 | 3/2007 | Tsang et al. |
| 2007/0154762 A1 | 7/2007 | Schucker |
| 2007/0221265 A1 | 9/2007 | Affinito et al. |
| 2008/0268327 A1 | 10/2008 | Gordon et al. |
| 2009/0061288 A1 | 3/2009 | Gordon et al. |
| 2009/0134040 A1 | 5/2009 | Gordon et al. |
| 2009/0134842 A1 | 5/2009 | Joshi et al. |
| 2009/0136830 A1 | 5/2009 | Gordon |
| 2009/0189567 A1 | 6/2009 | Joshi et al. |
| 2009/0212743 A1 | 8/2009 | Hagiwara et al. |
| 2010/0044241 A1 | 2/2010 | Pendleton et al. |
| 2010/0089762 A1 | 4/2010 | Gordon |
| 2010/0239893 A1 | 9/2010 | Gordon et al. |
| 2010/0261051 A1 | 10/2010 | Okada et al. |
| 2010/0279165 A1* | 11/2010 | Lemmon ............... H01M 4/58 429/102 |
| 2010/0285372 A1 | 11/2010 | Lee et al. |
| 2011/0104526 A1 | 5/2011 | Boxley et al. |
| 2011/0127967 A1* | 6/2011 | Soloveichik ...... H01M 10/3918 320/135 |
| 2011/0057135 A1 | 8/2011 | Boxley et al. |
| 2012/0015256 A1 | 1/2012 | Komaba et al. |
| 2012/0021273 A1 | 1/2012 | Ohmori et al. |
| 2012/0045695 A1 | 2/2012 | Sheem et al. |
| 2012/0126752 A1 | 5/2012 | Joshi et al. |
| 2012/0141856 A1 | 6/2012 | Gordon et al. |
| 2012/0164524 A1 | 6/2012 | Bogdan et al. |
| 2012/0061823 A1 | 7/2012 | Boxley et al. |
| 2012/0214043 A1 | 8/2012 | Olschimke et al. |
| 2012/0219833 A1 | 8/2012 | Coors et al. |
| 2012/0219838 A1 | 8/2012 | Coors et al. |
| 2012/0219843 A1 | 8/2012 | Bogdan et al. |
| 2013/0052525 A1 | 2/2013 | Kageura et al. |
| 2013/0130085 A1 | 5/2013 | Choi |
| 2013/0196224 A1 | 8/2013 | Kim et al. |
| 2014/0030571 A1 | 1/2014 | Bhavaraju et al. |
| 2014/0065456 A1 | 3/2014 | Bhavaraju et al. |
| 2014/0170443 A1 | 6/2014 | Bhavaraju et al. |

FOREIGN PATENT DOCUMENTS

| | | |
|---|---|---|
| FR | 2115522 A5 | 7/1972 |
| FR | 2301108 | 9/1976 |
| FR | 2518320 | 6/1983 |
| GB | 21599661 | 12/1985 |
| JP | 59-75985 | 4/1984 |
| JP | 61-032366 A | 2/1986 |
| JP | 62186470 | 8/1987 |
| JP | 08-017465 A | 1/1996 |
| JP | 10162807 | 6/1998 |
| JP | 2001-307709 | 11/2001 |
| JP | 2008293678 | 12/2008 |
| JP | 2008300173 | 12/2008 |
| JP | 201181971 | 4/2011 |
| JP | 2015-531218 | 9/2015 |
| KR | 100651246 | 8/2005 |
| KR | 20070021110 A | 2/2007 |
| WO | WO2012061823 | 8/1992 |
| WO | WO9416468 | 7/1994 |
| WO | WO2005038953 | 4/2005 |
| WO | WO-2005/091946 | 10/2005 |
| WO | WO2013154349 | 10/2013 |
| WO | WO-2014/039762 A1 | 3/2014 |
| WO | WO2014159542 | 10/2014 |

OTHER PUBLICATIONS

Akhtar, Kiran Q. , "Non Final Office Action", U.S. Appl. No. 14/040,241, dated Feb. 24, 2017, 1-21.

Gotz, Heide , "European Search Report", European Patent Application No. EP10829189.9, dated Nov. 18, 2016, 1-7.

Parsons, Thomas , "Non Final Office Action", U.S. Appl. No. 13/466,844, dated May 19, 2017, 1-10.

Unknown, , "Examination Report", Australian Patent Application No. 2013364191, dated Apr. 4, 2017, 1-3.

Young, Lee W., "International Search Report", PCT Search Report for App. No. PCT/US 08/10435, (dated Nov. 25, 2008),1-2.

Young, Lee W., "Written Opinion of the International Searching Authority", PCT Written Opinion for App. No. PCT/US 08/10435i, (dated Nov. 25, 2008),1-4.

Armand, Michel et al., "Ionic-liquid materials for the electrochemical challenges of the future", Nature Materials, (Jul. 24, 2009),621-629.

Doyle, Kevin P., et al., "Dentrite-Free Electrochemical Deposition of Li—Na Alloys from an Ionic Liquid Electrolyte", Journal of the Electrochemical Society, (May 2006),A1353-A1357.

Kim, K et al., "Electrochemical Investigation of Quaternary Ammonium/Aluminum Chloride Ionic Liquids", Journal of the Electrochemical Society, (Jun. 2004),A1168-A1172.

Kim, Ketack et al., "The Role of Additives in the Electroreduction of Sodium Ions in Chloroaluminate-Based Ionic Liquids",Journal of the Electrochemical Society, (Dec. 2004),E9-E13.

Lang, Christopher M., et al., "Cation Electrochemical Stability in Chloroaluminate Ionic Liquids", J. Phys. Chem., (2005),19454-19462.

Salminen, Justin et al., "Ionic liquids for rechargeable lithium batteries", Lawrence Berkeley National Laboratory, (Sep. 21),1-19.

Cullen, Sean P., "Office Action for U.S. Appl. No. 12/205,759", (dated Sep. 16, 2010),1-22.

Cullen, Sean P., "Office Action for U.S. Appl. No. 12/205,759", (dated Apr. 13, 2011),1-15.

Lee, Kang Young "International Search Report", International App. No. PCT/US2010/055718, (dated Jun. 21, 2011),1-3.

Lee, Kang Young "Written Opinion", International App. No. PCT/US2010/055718, (dated Jun. 21, 2011),1-3.

Cullen, Sean P., "Non-Final Office Action", U.S. Appl. No. 12/725,319, (dated Jan. 6, 2012),1-10.

Cullen, Sean P., "Final Office Action", U.S. Appl. No. 12/725,319, (dated Apr. 27, 2012),1-12.

Cho, Jun B., "International Search Report", PCT App. No. US2010/027535 (Corresponding to U.S. Appl. No. 12/725,319), (dated Oct. 20, 2010),1-4.

Cho, Jun B., "Written Opinion of the International Searching Authority", PCT App. No. US2010/027535 (Corresponding to U.S. Appl. No. 12/725,319), (dated Oct. 20, 2010),1-5.

Ryu, et al., "Bibliographical Data and Abstract (English Language)", Application Publication for US2007154814, Corresponding to KR10-0651246, (Aug. 22, 2005),1.

Wiedemann, Eric "Supplementary European Search Report", European Patent Application No. 10754004.9 (Corresponding to U.S. Appl. No. 12/725,319, (dated May 16, 2012),1-6.

Lee, Kang Y., "International Search Report", PCT App. No. US2010/055718 (Corresponding to U.S. Appl. No. 12/940,864), (dated Jun. 21, 2011),1-3.

Lee, Kang Y., "Written Opinion of the International Searching Authority", PCT App. No. US2010/055718 (Corresponding to U.S. Appl. No. 12/940,864, (dated Jun. 21, 2011),1-3.

Suzuki, et al., "Bibliographical Data and Abstract (English Language)", Japanese Patent application JP62-186470, (Aug. 14, 1987),1-2.

Sonoda, et al., "Bibliographical Data and Abstract (English Translation)", Japanese Patent Application JP-59-75985, (Apr. 28, 1984),1-2.

Abraham, et al., "A Low Temperature Na-S Battery Incorporating a Soluble S Cathode", ElectroChimica Acta, 1978, vol. 23, Pergamon Press Ltd., (Jun. 1, 1978),501-507.

Yun, Cho K., "Internationial Search Report", PCT App. No. PCT/US2012/036959 (corresponding to U.S. Appl. No. 13/466,844), (dated Nov. 23, 2012),1-3.

(56) References Cited

OTHER PUBLICATIONS

Yun, Cho K., "Written Opinion of the International Searching Authority", PCT App. No. PCT/US2012/036959 (corresponding to U.S. Appl. No. 13/466,844), (dated Nov. 23, 2012),1-5.
Cullen, Sean P., "Non Final Office Action", U.S. Appl. No. 12/205,759, (dated Apr. 5, 2013),1-17.
Lee, Dong W., "International Serach Report", PCT Application No. PCT/US13/68552 (Corresponding to U.S. Appl. No. 14/072,468, (dated Jan. 24, 2014),1-3.
Lee, Dong W., "Written Opinion of the International Searching Authority", PCT Application No. PCT/US2013/68552 (Corresponding to U.S. Appl. No. 14/072,468), (dated Jan. 24, 2014),1-5.
Lee, Dong W., "International Search Report", PCT Application No. PCT/US13/62386 (Corresponding to U.S. Appl. No. 14/040,241), (dated Dec. 23, 2013),1-3.
Lee, Dong W., "Written Opinion of the International Search Authority", PCT Application No. PCT/US2013/62386 (Corresponding to U.S. Appl. No. 14/040,241), (dated Dec. 23, 2014),1-5.
Lee, Dong W., "International Search Report", PCT Application No. PCT/US2013/058403 (Corresponding to U.S. Appl. No. 14/019,651), (dated Dec. 2, 2013),1-3.
Lee, Dong W., "Written Opinion of the International Searching Authority", PCT Application No. PCT/US2013/058403 (Corresponding to U.S. Appl. No. 14/019,651, (dated Dec. 2, 2013),1-6.
Marks, Jacob B., "Non Final Office Action", U.S. Appl. No. 14/469,865, (dated Apr. 7, 2015),1-6.
Shin, Ju C., "International Search Report", PCT Application No. PCT/US2014/059954 (Corresponding with U.S. Appl. No. 14/511,031), (dated Jan. 20, 2015),1-3.
Shin, Ju C., "Written Opinion of the International Searching Authority", PCT Application No. PCT/US2014/059954 (Corresponding with U.S. Appl. No. 14/511,031), (dated Jan. 20, 2015),1-4.
Jarvi, Tommi "Supplementary European Search Report", European Patent Application No. 12783042.0 (dated Oct. 14, 2014),1-7.
Takeguchi, Yasuhiro "Final Rejection Action", Japanese Patent Application No. 2012-537241, (dated Jun. 17, 2014),1-6.
"Notice of Allowance", Japanese Patent Application 2012-537241), (dated May 11, 2015),1-6.
Parsons, Thomas H., "Final Office Action", U.S. Appl. No. 13/466,844, (dated Aug. 11, 2015),1-13.
Masatsugu, Morimitsu "English Lanuage Abstract", JP2008293678, (dated Dec. 4, 2008),1.
Peramunage, et al., "A Solid Sulfur Cathode for Aqueous Batteries", *Science*, vol. 261, (Aug. 20, 1993),1029-1032.
Marks, Jacob B., "Non-Final Office Action", U.S. Appl. No. 12/940,864 (dated Jun. 18, 2013),1-30.
Marks, Jacob B., "Final Office Action", U.S. Appl. No. 12/940,864, (dated Jan. 29, 2014),1-11.
Marks, Jacob B., "Notice of Allowance", U.S. Appl. No. 12/940,864, (dated Jun. 20, 2014),1-7.
Cain, Edward J., "Non Final Office Action", U.S. Appl. No. 14/072,468, (dated Oct. 5, 2015),1-6.
Quraishi, Kiran "Non-Final Office Action", U.S. Appl. No. 14/040,241, (dated Oct. 28, 2015),1-12.
Colucci, Rios J., "Non-Final Office Action", U.S. Appl. No. 14/019,651, (dated Aug. 17, 2015),1-26.
Akhtar, Kiran Q., "Final Office Action", U.S. Appl. No. 14/040,241, dated May 18, 2016, 1-19.
Cain, Edward J., "Notice of Allowance", U.S. Appl. No. 14/072,468, dated Apr. 28, 2016, 1.7.
Coetzer, et al., "Bibliographic Data:", FR2518320, Jun. 17, 1983.
Colucci Rigs, Jose A., "Final Office Action", U.S. Appl. No. 14/019,651, dated Dec. 17, 2015, 1-30.
Colucci Rios, Jose A, "Non Final Office Action", U.S. Appl. No. 14/511,031, dated Apr. 12, 2016, 1-15.
Colucci Rios, Jose A, "Notice of Allowance", U.S. Appl. No. 14/019,651, dated Mar. 31, 2016, 1-7.
Grenness, Morten, "US Publication of", FR2301108, Dec. 20, 1977, 1-8.
Jarvi, Tommi, "European Examination Report", European Patent Application No. 12783042.0, dated Mar. 1, 2016, 1-8.
Kim, Yeon K., "International Search Report", PCT Application No. PCT/US2015/063244, dated Mar. 18, 2016, 1-3.
Kim, Yeon K., "Written Opinion of the International Searching Authority", PCT Application No. PCT/US2015/63244, dated Mar. 18, 2016, 1-3.
Masson, Jean-Pierre, "European Search Report", European Patent Application No. 13842649.9, dated Apr. 26, 2016, 1-8.
Parsons, Thomas H., "Non Final Office Action", U.S. Appl. No. 13/466,844, dated Mar. 23, 2016, 1-15.
Zhang, et al., "A Reveiw of the Electrochemical Performance of Alloy Anodes for Lithium-ion Batteries", Journal of Power Sources, Elsevier SA, CH, vol. 196, No. 1, Jan. 1, 2011, 13-24.
Communication pursuant to Article 94(3) EPC for European Application No. 13834937.8-1360 dated Sep. 29, 2017 (4 pages).
Final Rejection Office Action in U.S. Appl. No. 14/511,031 dated Nov. 3, 2016 (11 pages).
Notice of Allowance in U.S. Appl. No. 14/511,031 dated Aug. 10, 2017 (11 pages).
Notice of Allowance on U.S. Appl. No. 14/511,031 dated Jan. 9, 2018 (10 pages).
Notice of Reasons for Rejection in Japanese Application No. 2015-531218 (with English Translation) dated Jan. 9, 2018 (11 pages).
Notification of Reasons for Refusal in Japanese Application No. 2015-531218 (with English translation) dated Mar. 14, 2017 (9 pages).
Sakane, et al., "X A F S Analysis of Triiodide Ion in Solutions", Journal of Synchrotron Radiation, Dec. 31, 2001, vol. 8, pp. 674-676.
Supplementary European Search Report in EP Application No. 14842956.6 dated Mar. 27, 2017 (1 page).
Extended European Search Report for EP15865518.3 dated Jun. 29, 2018 (11 pages).
Notice of Reason for Rejection in KP Appl. No. 2016-540948 dated Jun. 14, 2018, with English translation (12 pages).
Dunn, Halina, "European Search Report", European Patent Application No. 13834937.8 (Corresponding to U.S. Appl. No. 14/019,651), dated Mar. 18, 2016, 1-7.
Kelly, Michael, "European Search Report", European Patent Application No. 13865228.4, dated Jul. 15, 2016, 1-7.
Kokai, "English Translation", JP 2011-81971, 1-6.
Kokai, "English Translation", JP 2008-300173, 1-8.
Parsons, Thomas H., "Non Final Office Action", U.S. Appl. No. 13/466,844, dated Feb. 26, 2015, 1-22.
Tsuji, Hirosuke, "Final Office Action", Japanese Patent Application No. 2014-510410 (Japanese Version), dated Apr. 5, 2016, 1-4.
Tsuji, Hirosuke, "Final Office Action", Japanese Patent Application No. 2014-510410 (English Translation), dated Apr. 5, 2016, 1-6.
Tsuji, Hirosuke, "Non-Final Office Action", Japanese Patent Application No. 2014-510410 (English Translation), dated Nov. 10, 2015, 1-15.
Tsuji, Hirosuke, "Non-Final Office Action", Japanese Patent Application No. 2014-510410 (Japanese Version), dated Nov. 10, 2015, 1-8.
Unknown, , "Notice of Allowance", Japanese Patent Application No. 2014-510410, dated Aug. 9, 2016, 1-4.

* cited by examiner

SODIUM-HALOGEN SECONDARY CELL

CROSS-REFERENCE TO RELATED APPLICATIONS

This application claims the benefit of and priority to U.S. Provisional Patent Application Ser. No. 62/087,507 entitled "SODIUM-HALOGEN SECONDARY CELL" filed Dec. 4, 2014. This application is also a continuation-in-part of U.S. patent application Ser. No. 14/511,031, entitled "SODIUM-HALOGEN SECONDARY CELL," filed Oct. 9, 2014, which claims the benefit of U.S. Provisional Patent Application Ser. No. 61/888,933 entitled "NASICON MEMBRANE BASED Na—$I_2$ BATTERY," filed Oct. 9, 2013. This application is also a continuation-in-part of U.S. patent application Ser. No. 14/019,651, entitled "SODIUM-HALOGEN BATTERY," filed Sep. 6, 2013, which claims the benefit of U.S. Provisional Patent Application Ser. No. 61/697,608 entitled "SODIUM-HALOGEN BATTERY," filed Sep. 6, 2012, and which also claims the benefit of U.S. Provisional Patent Application Ser. No. 61/777,967 entitled "SODIUM-HALOGEN SECONDARY CELL," filed Mar. 12, 2013, and which also claims the benefit of U.S. Provisional Patent Application Ser. No. 61/781,530 entitled "SODIUM-HALOGEN SECONDARY FLOW CELL," filed Mar. 14, 2013, and which also claims the benefit of U.S. Provisional Patent Application Ser. No. 61/736,444 entitled "BATTERY WITH BROMINE OR BROMIDE ELECTRODE AND SODIUM SELECTIVE MEMBRANE," filed Dec. 12, 2012. All of these prior patent applications are expressly incorporated herein by reference.

STATEMENT REGARDING FEDERALLY FUNDED RESEARCH

This invention was made with government support under Contract No. 1189875 awarded by the Sandia National Lab. The government has certain rights in the invention.

TECHNICAL FIELD

The disclosed invention relates to an intermediate temperature, sodium—halogen secondary cell (or rechargeable battery) with a sodium ion conductive electrolyte membrane and a positive electrolyte that comprises one or more sodium haloaluminate salts and a sodium halide. In some disclosed embodiments, the battery system utilizes a molten eutectic mixture of sodium haloaluminate salts having a relatively low melting point.

BACKGROUND

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolytes, which can either be in a solid state, a liquid state, or in a combination of such states. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, most, if not all, sodium batteries that require a high Faradaic efficiency employ a solid primary electrolyte separator, such as a solid ceramic primary electrolyte membrane. The principal advantage of using a solid ceramic primary electrolyte membrane is that the Faradaic efficiency of the resulting cell approaches 100%. Indeed, in almost all other cell designs, electrode solutions in the cell are able to intermix over time and, thereby, cause a drop in Faradaic efficiency and loss of battery capacity.

The primary electrolyte separators used in sodium batteries that require a high Faradaic efficiency often consist of ionically conductive polymers, porous materials infiltrated with ionically conductive liquids or gels, or dense ceramics. In this regard, many rechargeable sodium batteries that are presently available for commercial applications comprise a molten sodium metal negative electrode, a sodium β"-alumina ceramic electrolyte separator, and a molten positive electrode, which may include a composite of molten sulfur and carbon (called a sodium/sulfur cell). Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium β"-alumina ceramic electrolyte separator is typically more conductive and is better wetted by molten sodium at a temperature in excess of about 270° C. and/or because the molten positive electrode typically requires relatively high temperatures (e.g., temperatures above about 170° or 180° C.) to remain molten, many conventional sodium-based rechargeable batteries operate at temperatures higher than about 270° C. and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require their components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

Thus, while sodium-based rechargeable batteries are available, challenges with such batteries also exist, including those previously mentioned. Accordingly, it would be an improvement in the art to augment or even replace certain conventional sodium-based rechargeable batteries with other sodium-based rechargeable batteries that operate effectively at intermediate temperatures.

SUMMARY OF THE INVENTION

Examples of sodium-halogen secondary cells are disclosed in Applicant's copending U.S. patent application Ser. No. 14/019,651, published as U.S. Publication No. 2014/0065456 entitled "Sodium-Halogen Secondary Cell." The disclosed secondary cells include a positive electrode compartment housing a current collector disposed in a liquid positive electrode solution. Some examples of suitable positive electrode solution materials include organic solvents such as dimethyl sulfoxide, NMF (N-methylformamide), and ionic liquids.

The present disclosure provides an improvement to the positive electrode solution of the sodium-halogen secondary cells disclosed in Applicant's copending application. More specifically, the disclosed invention utilizes a positive electrolyte that comprises sodium halide in a molten haloaluminate electrolyte. In some disclosed embodiments, the battery system utilizes a molten eutectic mixture of sodium haloaluminate salts having a relatively low melting point.

A sodium ion conductive solid electrolyte separates the negative electrode and the positive electrode. In a non-limiting embodiment, the sodium ion conductive solid electrolyte comprises a NaSICON electrolyte material. The NaSICON electrolyte material has high sodium conductivity at cell operating temperatures.

In one non-limiting embodiment, the battery operates at a temperature in the range from 80° C. to 210° C.

In one non-limiting embodiment of the disclosed invention, the rechargeable sodium-halogen battery includes a negative electrode comprising metallic sodium in molten state. In another embodiment, the negative electrode may comprise metallic sodium in a solid state. The positive electrode comprises NaX, where X is a halogen selected from Cl, Br and I. The positive electrode is disposed in a molten salt positive electrolyte comprising $AlX_3$. In some embodiments, the positive electrolyte is a mixture of at least two $AlX_3$ salts that can be represented by the formula $NaAlX'_{4-\delta}X''_\delta$, where $0<\delta<4$, wherein X' and X'' are different halogens selected from Cl, Br and I.

The mixed molten salt positive electrolyte comprises at least two salts of the general formula $NaAlX'_4$ and $NaAlX''_4$ at various molar ratios, wherein X' and X'' are different halogens selected from Cl, Br and I. In one non-limiting embodiment, the molar ratio of $NaAlX'_4$ to $NaAlX''_4$ is in the range of 9:1 to 1:9 with corresponding $\delta$ values of 0.4 to 3.6.

The positive electrode comprises additional NaX or a mixture of NaX compounds added in a molar ratio to the mixed molten salt positive electrolyte ranging from 1:1 to 3:1 of $NaX:NaAlX'_{4-\delta}X''_\delta$. The excess NaX renders the positive electrolyte highly basic. At cell operating temperatures, the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

In other embodiments, the positive electrode is disposed in a mixed molten salt positive electrolyte comprising at least three salts that can be represented by the formula $NaAlX'_{4-\delta-\bar{\omega}}X''_\delta X'''_{\bar{\omega}}$, where X', X'' and X''' are three different halogens selected from Cl, Br, and I, where $0<\delta<4$, $0<\bar{\omega}<4$, and $0<\delta+\bar{\omega}<4$. The mixed molten salt positive electrolyte comprises $NaAlCl_4$, $NaAlBr_4$, and $NaAlI_4$, at various molar ratios.

The disclosed sodium haloaluminate molten salts are highly conductive at relatively low temperatures enabling the sodium-halogen battery to be highly efficient and reversible. These features and advantages of the present embodiments will become more fully apparent from the following description and appended claims.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," "in another embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium-based negative electrodes, liquid positive electrode solutions, current collectors, sodium ion conductive electrolyte membranes, etc., to provide a thorough understanding of embodiments of the invention. One having ordinary skill in the relevant art will recognize, however, that the invention may be practiced without one or more of the specific details, or with other methods, components, materials, and so forth. In other embodiments, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged," and "rechargeable" shall be interchangeable with the terms "charge," "charged," and "chargeable," respectively.

Figure 1:
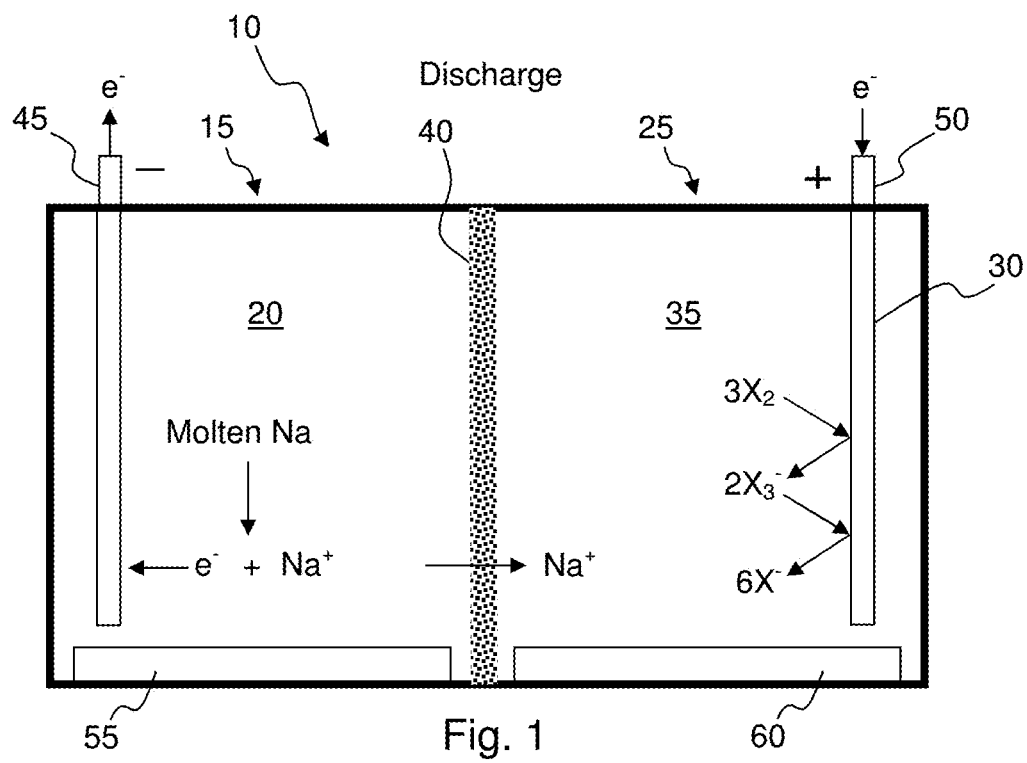
FIG. 1 depicts a schematic diagram of a representative embodiment of a molten sodium-halogen secondary cell, wherein the cell is in the process of being discharged.

The present embodiments provide a sodium-halogen secondary cell, which includes a molten or solid state sodium negative electrode and a sodium halide positive electrode disposed in a molten positive electrolyte that comprises one or more haloaluminate salts. In some disclosed embodiments, the secondary cell utilizes a molten eutectic mixture of sodium haloaluminate salts having a relatively low melting point. Although the described cell can comprise any suitable component, FIG. 1 shows a representative embodiment in which the sodium secondary cell 10 comprises a negative electrode compartment 15 that includes a sodium metal negative electrode 20 and a positive electrode compartment 25 that comprises a sodium halide positive electrode. The positive electrode includes a current collector 30 disposed in a positive electrolyte 35 comprising one or more molten haloaluminate salts ($AlCl_3$, $AlBr_3$, and $AlI_3$). A sodium ion conductive electrolyte membrane 40 separates the negative electrode from the positive electrode and positive electrolyte 35. The sodium ion conductive electrolyte membrane 40 separates a first terminal 45 from a second terminal 50. To provide a better understanding of the described cell 10, a brief description of how the cell functions is provided below. Following this discussion, each of the cell's components shown in FIG. 1 is discussed in more detail.

Turning now to the manner in which the sodium secondary cell 10 functions, the cell can function in virtually any suitable manner. In one example, FIG. 1 illustrates that as the cell 10 is discharged and electrons ($e^-$) flow from the negative electrode 20 (e.g., via the first terminal 45), sodium is oxidized from the negative electrode 20 to form sodium ions ($Na^+$). FIG. 1 shows that these sodium ions are respectively transported from the sodium negative electrode 20, through the sodium ion conductive membrane 40, and to the positive electrolyte 35.

Figure 2:
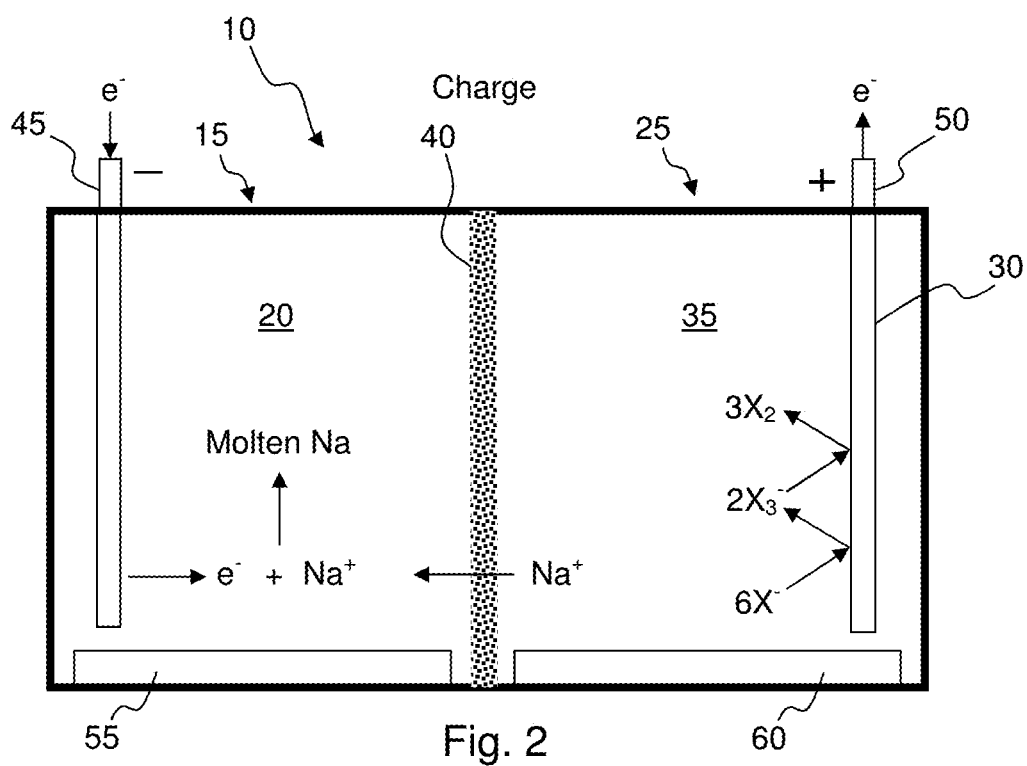
FIG. 2 depicts a schematic diagram of a representative embodiment of the molten sodium-halogen secondary cell, wherein the cell is in the process of being recharged.

In a contrasting example, FIG. 2 shows that as the secondary cell 10 is recharged and electrons ($e^-$) flow into the sodium negative electrode 20 from an external power source (not shown), such as a recharger, the chemical reactions that occurred when the cell 10 was discharged (as shown in FIG. 1) are reversed. Specifically, FIG. 2 shows that as the cell 10 is recharged, sodium ions ($Na^+$) are respectively transported from the positive electrolyte 35, through the electrolyte membrane 40, and to the negative electrode 20, where the sodium ions are reduced to form sodium metal (Na).

Referring now to the various components of the cell 10, the cell, as mentioned above, can comprise a negative electrode compartment 15 and a positive electrode compartment 25. In this regard, the two compartments can be any suitable shape and have any other suitable characteristic that allows the cell 10 to function as intended. By way of example, the negative electrode and the positive electrode compartments can be tubular, rectangular, or be any other suitable shape. Furthermore, the two compartments can have any suitable spatial relationship with respect to each other. For instance, while FIG. 2 shows that the negative electrode compartment 15 and the positive electrode compartment 25 can be adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 20, the cell 10 can comprise any suitable sodium negative electrode 20 that allows the cell 10 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

With respect to the positive current collector 30, the positive electrode compartment 25 can comprise any suitable positive electrode that allows the cell to be charged and discharged as intended. For instance, the positive electrode can comprise virtually any current collector 30 in combination with a halogen, shown generically as "X" in FIGS. 1 and 2, in a positive electrolyte 35 comprising one or more sodium haloaluminate salts. The current collector 30 can be disposed in any suitable location in the positive electrode compartment 25 that allows the cell 10 to function as intended.

With respect to the current collector 30, the cell 10 can comprise any suitable current collector that allows the cell to be charged and discharged as intended. For instance, the current collector can comprise virtually any current collector configuration that has been successfully used in a sodium-based rechargeable battery system. In some embodiments, the current collector comprises at least one of wires, felts, foils, plates, parallel plates, tubes, meshes, mesh screens, foams, and/or other suitable current collector configuration. It will be appreciated by those of skill in the art that the foam may include, without limitation, metal foams and carbon foams. Indeed, in some embodiments, the current collector comprises a configuration having a relatively large surface area which may include one or more mesh screens and metal foams.

The current collector 30 can comprise any suitable material that allows the cell 10 to function as intended. In this regard, some non-limiting examples of suitable current collector materials include tungsten, stainless steel, carbon, molybdenum, titanium, platinum, copper, nickel, zinc, a sodium intercalation material (e.g., $Na_xMnO_2$, etc.), nickel foam, nickel, a sulfur composite, a sulfur halide (e.g., sulfuric chloride), and/or another suitable material. Furthermore, these materials may coexist or exist in combinations.

In some embodiments, however, the current collector comprises tungsten, carbon, molybdenum, titanium.

Figure 3A:
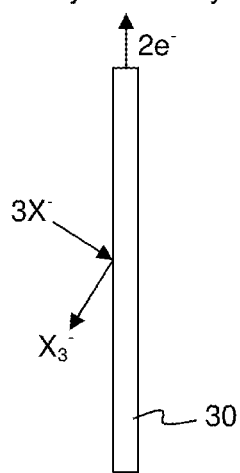
FIG. 3A depicts one potential reaction, designated Battery Chemistry 1, at the positive current collector.
Figure 3B:
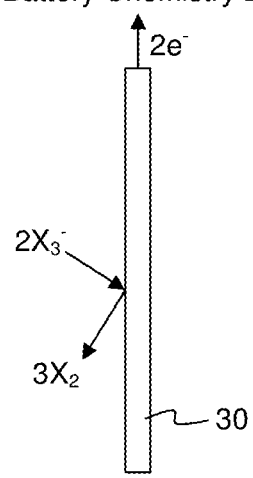
FIG. 3B depicts another potential reaction, designated Battery Chemistry 2, at the positive current collector.

In some non-limiting embodiments, the reactions that may occur at the negative electrode 20, the positive electrode/current collector 30, and the overall reaction as the cell 10 is discharged may occur in at least two steps. These two potential reactions are shown below and designated Battery Chemistry 1 (shown schematically in FIG. 3A for battery recharge) and Battery Chemistry 2 (shown schematically in FIG. 3B for battery recharge). It has been observed that these reactions may be individual steps of a multi-step reaction, or depending upon the battery conditions, one step may be favored over another step.

Negative electrode $Na \leftrightarrow Na^+ + 1e^-$
Positive electrode $X_3^- + 2e^- \leftrightarrow 3X^-$ (Battery Chemistry 1)
Positive electrode $3X_2 + 2e^- \leftrightarrow 2X_3^-$ (Battery Chemistry 2)
Overall $2Na + X_3^- \leftrightarrow 2Na^+ + 3X^-$ (Battery Chemistry 1)
Overall $2Na + 3X_2 \leftrightarrow 2Na^+ + 2X_3^-$ (Battery Chemistry 2)
Where X comprises iodine, bromine, or chlorine.

Where X comprises iodine, the cell 10 may have the following chemical reactions and the following theoretical voltage (V vs. SHE (standard hydrogen electrode)) and theoretical specific energy (Wh/kg):

Negative electrode $Na \leftrightarrow Na^+ + 1e^-$ (−2.71V)
Positive electrode $I_3^- + 2e^- \leftrightarrow 3I^-$ (0.29V, Chemistry 1)
Positive electrode $3I_2 + 2e^- \leftrightarrow 2I_3^-$ (0.74V, Chemistry 2)
Overall $2Na + I_3^- \leftrightarrow 2Na^+ + 3I^-$ (2.8V, Chemistry 1) (388 Wh/kg)
Overall $2Na + 3I_2 \leftrightarrow 2Na^+ + 2I_3^-$ (3.25V, Chemistry 2) (193 Wh/kg)

Where X is iodine, the charging reactions at the positive electrode may occur in two steps: 1) iodide to triiodide and 2) triiodide to iodine. Similarly, discharging reactions at the positive electrode may occur in two steps: 1) iodine to triiodide and 2) triiodide to iodide. Alternatively, the charging and discharging reactions may occur using the combination of reaction chemistries above.

Where X is bromine, the cell 10 may have the following chemical reactions and the following theoretical voltage (V vs. SHE) and theoretical specific energy (Wh/kg):

Negative electrode $Na \leftrightarrow Na^+ + 1e^-$ (−2.71V)
Positive electrode $Br_3^- + 2e^- \leftrightarrow 3Br^-$ (0.82V, Chemistry 1)
Positive electrode $3Br_2 + 2e^- \leftrightarrow 2Br_3^-$ (1.04V, Chemistry 2)
Overall $2Na + Br_3^- \leftrightarrow 2Na^+ + 3Br^-$ (3.53V, Chemistry 1) (658 Wh/kg)
Overall $2Na + 3Br_2 \leftrightarrow 2Na^+ + 2Br_3^-$ (3.75V, Chemistry 2) (329 Wh/kg)

The charging reactions at the positive electrode may occur in two steps: 1) bromide to tribromide and 2) tribromide to bromine. Similarly, discharging reactions at the positive electrode may occur in two steps: 1) bromine to tribromide and 2) tribromide to bromide. Alternatively, the charging and discharging reactions may occur using the combination of reaction chemistries above.

It will be appreciated by those of skill in the art that an alternative positive electrode chemistry may include:

Positive electrode $X_2 + 2e^- \leftrightarrow 2X^-$ (Battery Chemistry 3)
With an overall battery chemistry of:
Overall $2Na + X_2 \leftrightarrow 2Na^+ + 2X^-$ (Battery Chemistry 3)

With regards now to the sodium ion conductive electrolyte membrane 40, the membrane can comprise any suitable material that selectively transports sodium ions and permits the cell 10 to function with a positive electrolyte 35. In some embodiments, the electrolyte membrane comprises a NaSICON-type (sodium Super Ion CONductive) material. Where the electrolyte membrane comprises a NaSICON-type material, the NaSICON-type material may comprise any known or novel NaSICON-type material that is suitable for use with the described cell 10. Some suitable examples of NaSICON-type compositions include, but are not limited to, $Na_3Zr_2Si_2PO_{12}$, $Na_{1+x}Si_xZr_2P_{3-x}O_{12}$ (where x is between about 1.6 and about 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12)), $Na_{1-x}Zr_2Si_xP_{3-x}O_{12}$ (where x is between about 0 and about 3, and in some cases between about 2 and about 2.5), and Fe-doped NaSICON ($Na_3Zr_2/_3Fe_4/_3P_3O_{12}$). Indeed, in certain embodiments, the NaSICON-type membrane comprises $Na_3Si_2Zr_2PO_{12}$. In other embodiments, the NaSICON-type membrane comprises one or more NaSELECT® materials, produced by Ceramatec, Inc. in Salt Lake City, Utah.

The positive electrode comprises NaX, where X is a halogen selected from Cl, Br and I. The positive electrode is preferably NaI.

The positive electrode is disposed in a molten salt positive electrolyte comprising $AlX_3$. NaX and $AlX_3$ may combine to form $NaAlX_4$ as follows:

$NaX + AlX_3 \leftrightarrow AlX_4$

In some embodiments, the positive electrode is combined with a mixture of at least two $AlX_3$ salts. The combination of positive electrode and positive electrolyte can be represented by the general formula $NaAlX'_{4-\delta}X''_\delta$, where $0<\delta<4$, wherein X' and X" are different halogens selected from Cl, Br and I.

The mixed molten salt positive electrolyte comprises at least two salts of the general formula $NaAlX'_4$ and $NaAlX''_4$ at various molar ratios, wherein X' and X" are different halogens selected from Cl, Br and I. In one non-limiting embodiment, the molar ratio of $NaAlX'_4$ to $NaAlX''_4$ is in the range of 9:1 to 1:9 with corresponding δ values of 0.4 to 3.6.

The positive electrode comprises additional NaX or a mixture of NaX compounds added in a molar ratio to the mixed molten salt positive electrolyte ranging from 1:1 to 3:1 of $NaX:NaAlX'_{4-\delta}X''_\delta$. The excess NaX renders the positive electrolyte highly basic. At cell operating temperatures, the positive electrode and mixed molten salt positive electrolyte is a molten liquid or a two phase mixture wherein the mixed molten salt positive electrolyte is predominantly a liquid phase and the additional NaX or mixture of NaX compounds is a solid phase.

The following Table 1 illustrates some non-limiting combinations of NaX and $AlX_3$ to form $NaAlX_4$.

TABLE 1

| NaX | AlX₃ | | |
|---|---|---|---|
| | AlCl₃ | AlBr₃ | AlI₃ |
| NaCl | NaAlCl₄ | NaAlBr₃Cl | NaAlI₃Cl |
| NaBr | NaAlCl₃Br | NaAlBr₄ | NaAlI₃Br |
| NaI | NaAlCl₃I | NaAlBr₃I | NaAlI₄ |

In other embodiments, the positive electrode is disposed in a mixed molten salt positive electrolyte comprising at least three salts that can be represented by the formula $NaAlX'_{4-\delta-\bar{\omega}}X''_\delta X'''_{\bar{\omega}}$, where X', X" and X'" are three different halogens selected from Cl, Br, and I, where $0<\delta<4$, $0<\bar{\omega}<4$, and $0<\delta+\bar{\omega}<4$. The mixed molten salt positive electrolyte comprises $NaAlCl_4$, $NaAlBr_4$, and $NaAlI_4$, at various molar ratios.

In some embodiments, the positive electrolyte 35 also comprises one or more halogens and/or halides. In this regard, the halogens and halides, as well polyhalides and/or metal halides that form therefrom (e.g., where the current collector 30 comprises a metal, such as copper, nickel, zinc, etc. (as discussed below)) can perform any suitable function, including, without limitation, acting as the positive electrode as the cell 10 operates. Some examples of suitable halogens include bromine, iodine, and chlorine. Similarly, some examples of suitable halides include bromide ions, polybromide ions, iodide ions, polyiodide ions, chloride ions, and polychloride ions. While the halogens/halides can be introduced into the positive electrode solution in any suitable manner, in some embodiments, they are added as NaX, wherein X is selected from Br, I, Cl, etc.

With reference now to the terminals 45 and 50, the cell 10 can comprise any suitable terminals that are capable of electrically connecting the cell with an external circuit (not shown), including without limitation, to one or more cells. In this regard, the terminals can comprise any suitable material, be of any suitable shape, and be of any suitable size.

In addition to the aforementioned components, the cell 10 can optionally comprise any other suitable component. By way of non-limiting illustration FIGS. 1 and 2 show an embodiment in which the cell 10 comprises a heat management system 55, 60. Independent heat management systems may be associated with the negative electrode and positive electrode compartments. Alternatively, a single heat management system may be disposed in only one compartment or to the exterior of the cell 10 generally. In such embodiments, the cell can comprise any suitable type of heat management system that is capable of maintaining the cell within a suitable operating temperature range. Some examples of such heat management systems include, but are not limited to, a heater, a cooler, one or more temperature sensors, and appropriate temperature control circuitry.

The described cell 10 may function at any suitable operating temperature. In other words, as the cell is discharged and/or recharged, the sodium negative electrode and the positive electrolyte may have any suitable temperature. The negative and positive electrode compartments may operate at the same or different temperatures. Indeed, in some embodiments, the cell functions at an intermediate operating temperature in the range from about 80° C. to about 210° C. In other embodiments, the cell may function at an intermediate operating temperature in the range from about 110° C. to about 180° C. In yet another embodiment, the operating temperature of the cell in the range of about 150° C. to about 170° C.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Example 1

Figure 4:
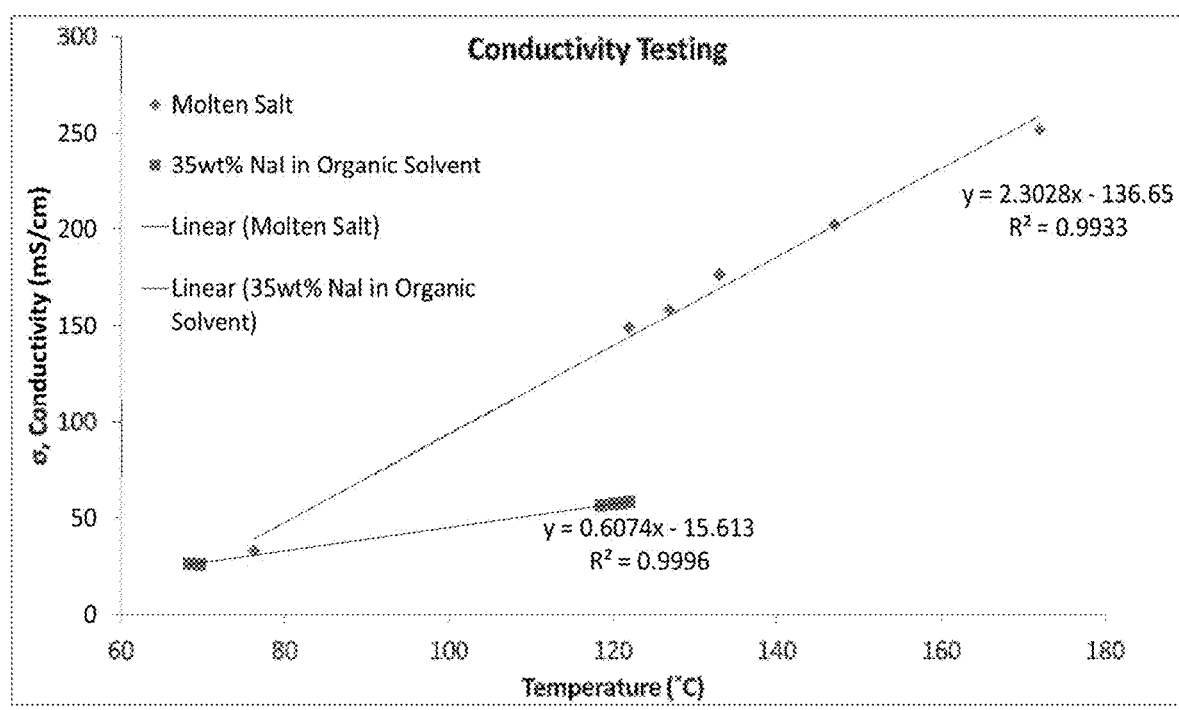
FIG. 4 is a graph comparing the conductivity of NaI in a molten salt electrolyte and in an organic solvent as a function of temperature.

The conductivity of NaI in a molten salt positive electrolyte $AlCl_3$ was compared to the conductivity of NaI in an organic solvent solution that included N-methyl formamide. The molten salt positive electrolyte had a general formula of $NaAl_xI_yCl_z$. The conductivity of NaI in a molten salt positive electrolyte was approximately three times the conductivity of the organic solvent-based electrolyte at 120° C., as shown in FIG. 4. Cells utilizing a molten salt positive electrolyte will be more energy dense due to higher molarity of NaI. Furthermore, cells utilizing a molten salt positive electrolyte are safer than organic solvent based positive electrolyte solutions because if molten sodium happens to contact the molten salt positive electrolyte, the chemical reaction would only produce non-flammable salts.

Example 2

Figure 5A:
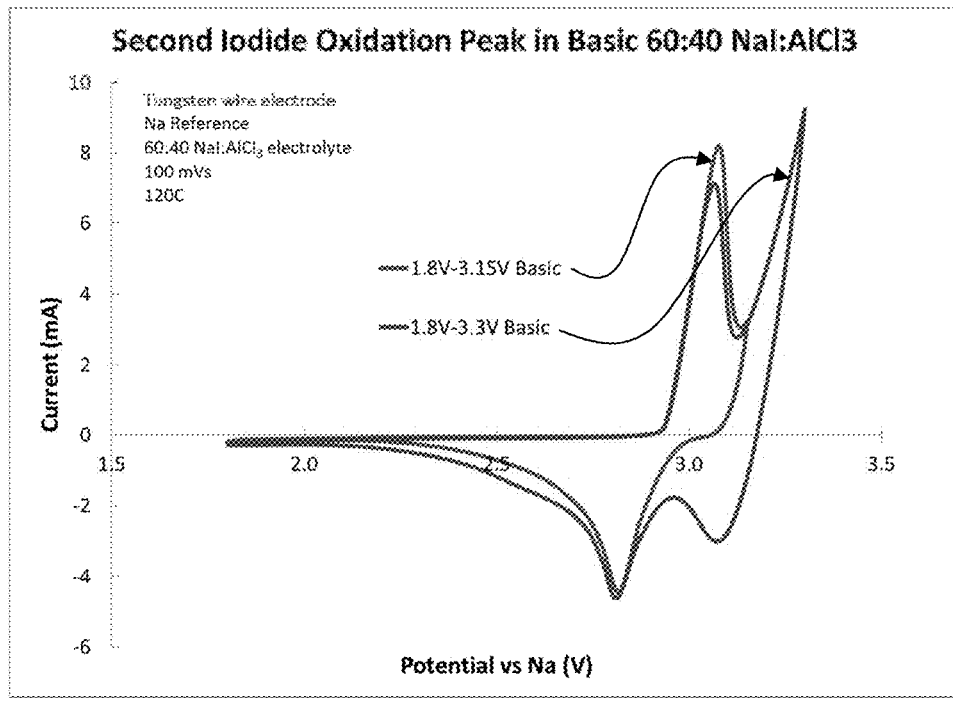
FIGS. 5A and 5B are graphs comparing the oxidation of iodide in a sodium-iodine secondary cell containing NaI in $AlCl_3$ at basic and acidic ratios of $NaI:AlCl_3$.
Figure 5B:
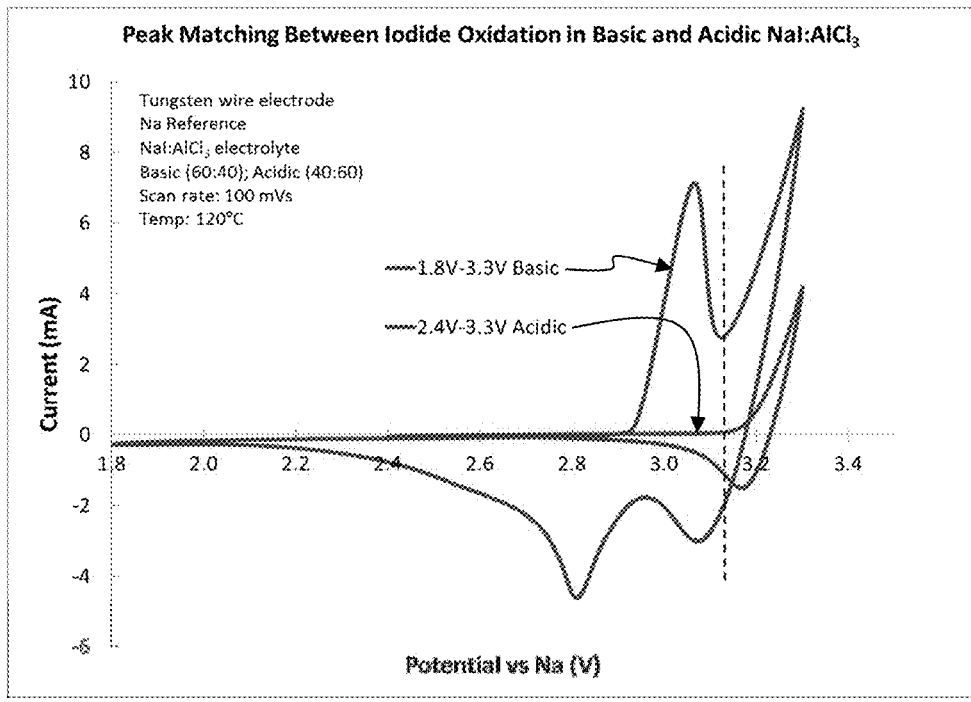

A sodium-iodine secondary cell was prepared as described herein containing sodium iodide in molten $AlCl_3$ in a 60:40 $NaI:AlCl_3$ ratio (a "basic" electrolyte). Tungsten wire was used as the positive current collector. NaSICON was used to separate a molten sodium negative electrode from the positive electrode/positive electrolyte. The oxidation of iodide was measured and found to produce two oxidation peaks, consistent with Battery Chemistry 1 and Battery Chemistry 2, described herein. Experimental results are shown in FIG. 5A. The oxidation peaks were found to be reversible. Additional tests were performed using an "acidic" electrolyte comprising sodium iodide in molten $AlCl_3$ in a 40:60 $NaI:AlCl_3$ ratio. Experimental results are shown in FIG. 5B. The results suggest that the second oxidation peak in the basic electrolyte occurs at a similar potential as the first iodide oxidation peak in the acidic electrolyte. The reduction peak in acidic electrolyte occurs at a higher potential. This suggests that whether the electrolyte is acidic or basic affects the potential of $I_2$ generation.

Example 3

Three symmetrical sodium-iodine secondary cells were prepared to test the reversibility of the oxidation/reduction reactions that occur in the positive electrode/positive electrolyte. The symmetrical cells were prepared as set forth in Table 2, below:

TABLE 2

| Cell | Electrode | | Electrolyte | |
|---|---|---|---|---|
| | Outside of tube | Inside of tube | Outside of Tube | Inside of Tube |
| Symmetrical Cell 1 | Graphite felt with tungsten wire | Graphite felt with tungsten wire | 1M $I_2$ in 51:49 mol % $NaI:AlCl_3$ | 1M $I_2$ in 51:49 mol % $NaI:AlCl_3$ |
| Symmetrical Cell 2 | 0.93 g NaI/0.93 g C/PTFE around tungsten mesh | Tungsten wire with graphite felt | 60:40 mol % $NaI:AlCl_3$ | 0.02475 g $I_2$ in 51:49 mol % $NaI:AlCl_3$ |
| Symmetrical Cell 3 | Graphite felt with tungsten wire | 0.25" Carbon Rod | 60:40 mol % $NaI:AlCl_3$ | 50:50 mol % $NaI:AlCl_3$ |

The symmetrical cells were operated as set forth in Table 3, below:

TABLE 3

| Cell | Temperature (° C.) | EIS Ohmic (Ω) | EIS System (Ω) | Operating Range Upper Voltage Limit (V) | Operating Range Lower Voltage Limit (V) | Current Density (mA/cm²) |
|---|---|---|---|---|---|---|
| Symmetrical Cell 1 | 125 | 2.17 | 5.19 | 0.5 | −0.5 | 91 |
| Symmetrical Cell 2 | 125 | 3.60 | 16.40 | 0.5 | −0.5 | 72 |
| Symmetrical Cell 3 | 125 | 5.00 | 6.70 | 0.15 | −0.15 | 20 |

Figure 6:
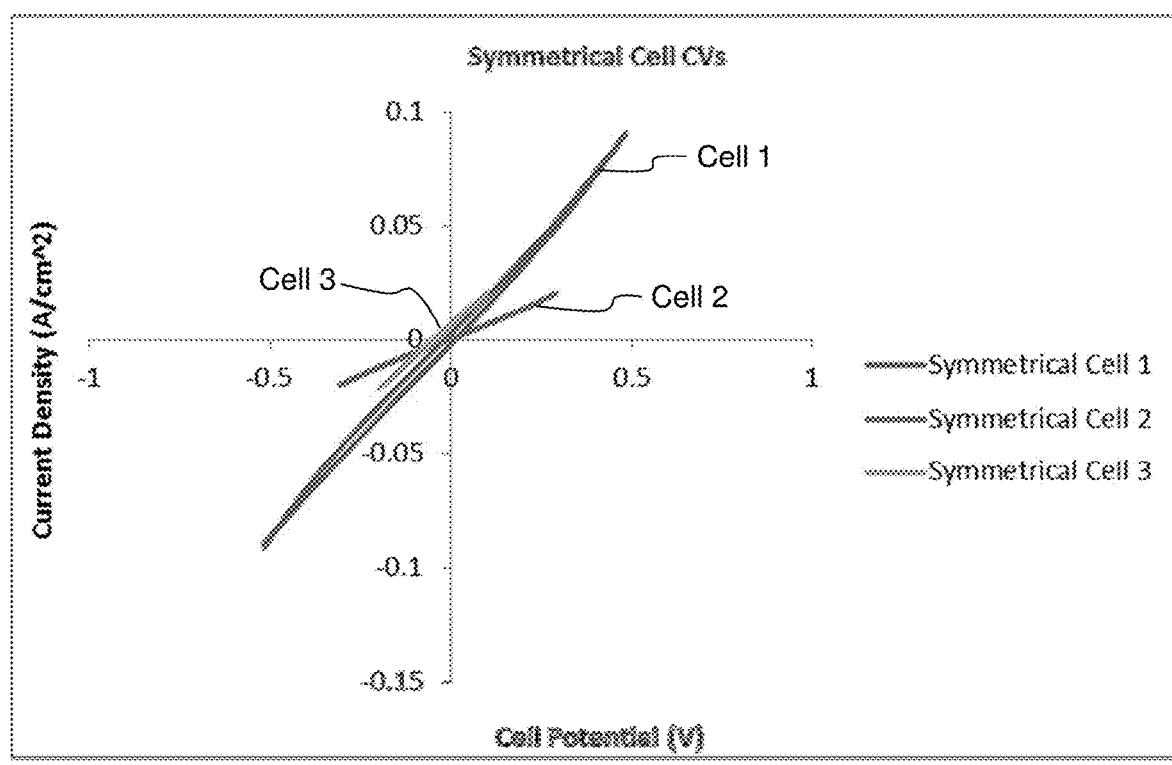
FIG. 6 is a graph of the current vs. voltage for the operation of the symmetrical cells described in Example 3.

A graph of the current vs. voltage for the operation of the symmetrical cells is shown in FIG. 6. Because there is little or no hysteresis shown in FIG. 6, it may be concluded that the oxidation/reduction reactions that occur in the positive electrode/positive electrolyte are highly reversible.

Embodiments of the present invention may be embodied in other specific forms without departing from its spirit or essential characteristics. The described embodiments and examples are to be considered in all respects only as illustrative and not as restrictive. The scope of the invention is, therefore, indicated by the appended claims rather than by the foregoing description. All changes that come within the meaning and range of equivalency of the claims are to be embraced within their scope.

What is claimed is:

1. A sodium-halogen secondary cell, comprising:
   a negative electrode compartment comprising a negative electrode that comprises metallic sodium in molten or solid state, wherein the negative electrode electrochemically oxidizes to release sodium ions during discharge and electrochemically reduces sodium ions to form sodium metal during recharge;
   a positive electrode compartment consisting of:
     a NaX positive electrode disposed in a mixed molten positive electrolyte consisting of one or more $NaAlX_4$ salts, wherein X is the same or different element selected from Cl, Br, and I;
     additional NaX or a mixture of NaX compounds present in a molar ratio of the additional NaX or mixture of NaX compounds to the mixed molten positive electrolyte of 1:1 to 3:1; and
     a current collector; and
   a sodium ion conductive solid electrolyte membrane comprising a NaSICON-type material and that separates the negative electrode compartment from the positive electrode compartment; and
   wherein:
     the overall battery chemistry of the sodium-halogen secondary cell is $2Na + X_2 \leftrightarrow 2Na^+ + 2X^-$; and
     the additional NaX or mixture of NaX compounds are present in a solid phase at operating temperature of the sodium-halogen secondary cell.

2. The secondary cell of claim 1, wherein the mixed molten positive electrolyte is a mixture of two different $NaAlX_4$ salts represented by the general formula $NaAlX'_{4-\delta}X''_{\delta}$, where $0<\delta<4$, wherein X' and X'' are different elements selected from Cl, Br and I.

3. The secondary cell of claim 2, wherein the two different $NaAlX_4$ salts have the general formula $NaAlX'_4$ and $NaAlX''_4$ at various molar ratios.

4. The secondary cell of claim 3, wherein the molar ratio of $NaAlX'_4$ to $NaAlX''_4$ is in the range of 9:1 to 1:9 with corresponding δ values of 0.4 to 3.6.

5. The secondary cell of claim 3, wherein the molar ratio of the additional NaX or mixture of NaX compounds to the mixed molten positive electrolyte is greater than 1:1 to 3:1 of $NaX:NaAlX'_{4-\delta}X''_{\delta}$.

6. The secondary cell of claim 1, wherein the secondary cell operates at a temperature between 80° C. and 210° C.

7. The secondary cell of claim 1, wherein the mixed molten positive electrolyte is a mixture of three different $NaAlX_4$ salts and is represented by the general formula $NaAlX'_{4-\delta-\overline{\omega}}X''_{\delta}X'''_{\overline{\omega}}$, where X', X'' and X''' are three different elements selected from Cl, Br, and I, where $0<\delta<4$, $0<\overline{\omega}<4$, and $0<\delta+\overline{\omega}<4$.

8. The secondary cell of claim 7, wherein the three different $NaAlX_4$ salts have the formula $NaAlCl_4$, $NaAlBr_4$, and $NaAlI_4$, at various molar ratios.

9. The secondary cell of claim 7, wherein the additional NaX or mixture of NaX compounds are present in a molar ratio of the additional NaX or mixture of NaX compounds to the mixed molten positive electrolyte ranging from greater than 1:1 to 3:1 of $NaX:NaAlX'_{4-\delta-\overline{\omega}}X''_{\delta}X'''_{\overline{\omega}}$, where $0<\delta<4$, $0<\overline{\omega}<4$, and $0<\delta+\overline{\omega}<4$.

10. The secondary cell of claim 1, wherein the current collector comprises at least one of carbon, tungsten, molybdenum, and titanium.

11. The secondary cell of claim 1, wherein the current collector comprises at least one of wires, felts, foils, plates, parallel plates, tubes, meshes, mesh screens, and foams.

12. A sodium-halogen secondary cell, comprising:
   a negative electrode compartment comprising a negative electrode that comprises metallic sodium in molten state, wherein the negative electrode electrochemically oxidizes to release sodium ions during discharge and electrochemically reduces sodium ions to form sodium metal during recharge;
   a positive electrode compartment consisting of:
     a NaI positive electrode disposed in a mixed molten positive electrolyte consisting of comprising one or more $NaAlX_4$ salts, wherein X is the same or different element selected from Cl, Br, and I;
     additional NaI is present in a molar ratio of NaI to the mixed molten positive electrolyte of 1:1 to 3:1; and
     a current collector; and
   a sodium ion conductive solid electrolyte membrane that separates the negative electrode compartment from the positive electrode compartment; and
   wherein the overall battery chemistry of the sodium-halogen secondary cell is $2Na + I_2 \leftrightarrow 2Na^+ + 2I^-$; and
   the additional NaI is present in a solid phase at operating temperature of the sodium-halogen secondary cell.

13. A sodium-halogen secondary cell, comprising:
   a negative electrode compartment comprising a negative electrode that comprises metallic sodium in molten or solid state, wherein the negative electrode electrochemically oxidizes to release sodium ions during discharge and electrochemically reduces sodium ions to form sodium metal during recharge;
   a positive electrode compartment consisting of:
     a NaX positive electrode disposed in a mixed molten positive electrolyte consisting of at least two different $NaAlX_4$ salts and is represented by the general formula $NaAlX'_{4-\delta}X''_{\delta}$, wherein $0<\delta<4$, and X' and X" are different element selected from Cl, Br, and I;
additional NaX or a mixture of NaX compounds present in a molar ratio of the additional NaX or mixture of NaX compounds to the mixed molten positive electrolyte ranging from greater than 1:1 to 3:1 of $NaX:NaAlX'_{4-\delta}X''_{\delta}$; and
a current collector; and
a sodium ion conductive solid electrolyte membrane that separates the negative electrode compartment from the positive electrode compartment; and
wherein:
the overall battery chemistry of the sodium-halogen secondary cell is $2Na+X_2 \leftrightarrow 2Na^+ + 2X^-$; and
the additional NaX or mixture of NaX compounds are present in a solid phase within the positive electrode at operating temperature of the sodium-halogen secondary cell.

14. The secondary cell of claim 13, wherein the mixed molten positive electrolyte comprises three different $NaAlX_4$ salts and is represented by the general formula $NaAlX'_{4-\delta-\overline{\omega}}X''_{\delta}X'''_{\overline{\omega}}$, where X', X" and X''' are three different elements selected from Cl, Br, and I, where $0<\delta<4$, $0<\overline{\omega}<4$, and $0<\delta+\overline{\omega}<4$; and
wherein the additional NaX or a mixture of NaX compounds present in a molar ratio of the additional NaX or mixture of NaX compounds to the mixed molten positive electrolyte ranging from 1:1 to 3:1 of $NaX:NaAlX'_{4-\delta-\overline{\omega}}X''_{\delta}X'''_{\overline{\omega}}$.

15. The secondary cell of claim 14, wherein the three $NaAlX_4$ salts have the formula $NaAlCl_4$, $NaAlBr_4$, and $NaAlI_4$, at various molar ratios.

16. The secondary cell of claim 13, wherein the secondary cell operates at a temperature between about 80° C. and 210° C.

17. The secondary cell of claim 13, wherein the electrolyte membrane comprises a NaSICON-type material.

* * * * *